United States Patent
Inaba et al.

[19]

[11] Patent Number: 5,940,555
[45] Date of Patent: Aug. 17, 1999

[54] OPTICAL MULTIPLEXER/DEMULTIPLEXER

[75] Inventors: Kimio Inaba, Ibaraki; Kenji Akiba, Fukushima, both of Japan

[73] Assignee: Hitachi Cable, Ltd., Tokyo, Japan

[21] Appl. No.: 08/937,473

[22] Filed: Sep. 25, 1997

[30] Foreign Application Priority Data

Feb. 14, 1997 [JP] Japan .................................. 9-030795

[51] Int. Cl.⁶ .............................. G02B 6/28; H04J 14/02
[52] U.S. Cl. ............................... 385/24; 385/14; 385/37; 385/46; 359/127; 359/130
[58] Field of Search .................. 385/14, 24, 27, 385/31, 37, 39, 47, 46, 49, 51, 129, 130, 131; 359/115, 124, 127, 130

[56] References Cited

U.S. PATENT DOCUMENTS

| | | |
|---|---|---|
| 4,744,619 | 5/1988 | Cameron ............................ 385/49 X |
| 4,904,042 | 2/1990 | Dragone ............................ 385/46 X |
| 5,002,350 | 3/1991 | Dragone ............................ 385/24 X |
| 5,136,671 | 8/1992 | Dragone ............................ 385/46 |
| 5,208,885 | 5/1993 | Dragone et al. .................... 385/49 |
| 5,243,672 | 9/1993 | Dragone ............................ 385/46 |
| 5,339,157 | 8/1994 | Glance et al. ...................... 385/24 |
| 5,341,444 | 8/1994 | Henry et al. ....................... 385/11 |
| 5,465,312 | 11/1995 | Maxwell et al. ................... 385/49 |
| 5,515,464 | 5/1996 | Sheem .............................. 385/49 |
| 5,706,377 | 1/1998 | Li .................................. 385/37 |
| 5,745,618 | 4/1998 | Li .................................. 385/46 |
| 5,822,481 | 10/1998 | Mestric ............................ 385/46 |
| 5,841,919 | 11/1998 | Akiba et al. ....................... 385/37 |

FOREIGN PATENT DOCUMENTS

7-117612  12/1997  Japan .................................. 385/24 X

Primary Examiner—Brian Healy
Attorney, Agent, or Firm—McDermott, Will & Emery

[57] ABSTRACT

Provision of a predetermined number of artificial waveguides having a predetermined core width along a plurality of channel waveguides on both sides of an array waveguide diffraction grating can reduce a variation and fluctuation in core width, improving crosstalk characteristics.

4 Claims, 6 Drawing Sheets

FIG.10

OPTICAL MULTIPLEXER/DEMULTIPLEXER

FIELD OF THE INVENTION

The present invention relates to an optical wavelength multiplexer/demultiplexer for multiplexing or demultiplexing a plurality of signal lights having a predetermined wavelength spacing and particularly to an optical wavelength multiplexer/demultiplexer capable of improving crosstalk characteristics.

BACKGROUND OF THE INVENTION

In the field of optical communication, a wavelength-division multiplex transmission system has been studied wherein a plurality of signals are put on light having a plurality of wavelengths with a wavelength spacing of about 1 nm and the light loaded with the plurality of signals are transmitted through one optical fiber to increase communication capacity. In this system, an optical wavelength-division multiplexer/demultiplexer for multiplexing or demultiplexing a plurality of signal lights having a predetermined wavelength spacing plays an important role. Among others, an optical wavelength multiplexer/demultiplexer using an array waveguide diffraction grating can increase the number of multiplexings in communication capacity at a narrow wavelength spacing and, hence, is promising.

The conventional optical wavelength multiplexer/demultiplexer using an array waveguide diffraction grating is disclosed in, for example, Japanese Patent Laid-Open No. 163406/1992 and the like. According to the conventional optical wavelength multiplexer/demultiplexer, a wavelength multiplexed signal light with N waves of wavelengths $\lambda_1$–$\lambda_N$ having wavelength spacing $\Delta\lambda$ being multiplexed, upon entrance into an input channel waveguide through an optical fiber, is broaden by the diffraction effect in an input slab waveguide and, after branching, enters a plurality of channel waveguides constituting an array waveguide diffraction grating. To the wavelength multiplexed signal light, which has entered the plurality of channel waveguides, is given a phase difference according to the waveguide length of the channel waveguide for each wavelength $\lambda_1$–$\lambda_N$. This permits signal light of $\lambda_1$ output from the channel waveguide to be entirely condensed in a position corresponding to the incident section of the output channel waveguide. Similarly, signal lights of $\lambda_2$, $\lambda_3$ . . . $\lambda_N$ are condensed in positions corresponding respectively to incident sections of the output channel waveguides. The signal lights, which have been demultiplexed and condensed in the incident sections of the output channel waveguides, are propagated through the output channel waveguides and output from the output side thereof.

According to the conventional optical wavelength multiplexer/demultiplexer, there is a difference in density of the plurality of channel waveguides between the center portion and both end portions. Therefore, in the preparation of a plurality of channel waveguides, even when the cores are designed to have an identical width, the difference in etching speed unfavorably creates a variation or fluctuation in core width. The phase velocity of the array waveguide diffraction grating depends upon the core width, and the variation and fluctuation in core width create a deviation from the set value with respect to the condensing position and the amount of condensation within the output slab waveguide.

On the other hand, the creation of a deviation from the design value with respect to the phase difference of the channel waveguides and the creation of a deviation of the condensing position of the signal light results in the creation of tailing. The tail of the signal light is superposed on a waveguide mode of the different output channel waveguide, providing such a wavelength loss curve that a very small amount of light is present in a wavelength distant from the wavelength $\lambda_i$. This imperfect condensing is causative of increased light leakage to a different service band, posing a problem of deteriorated crosstalk.

SUMMARY OF THE INVENTION

Accordingly, an object of the present invention is to provide an optical wavelength multiplexer/demultiplexer which can reduce the variation and fluctuation in core width and improve the crosstalk characteristics.

According to the invention, an optical multiplexer/demultiplexer, comprises:

an input channel waveguide provided on a substrate, the input channel waveguide being adapted for inputting a wavelength multiplexed signal light formed by multiplexing a plurality of signal lights having a predetermined wavelength spacing;

an input slab waveguide for broadening the wavelength multiplexed signal light output from the input channel waveguide;

an array waveguide diffraction grating having a plurality of channel waveguides, the plurality of channel waveguides having a waveguide length determined by the wavelength spacing and adapted for branching and propagating the wavelength multiplexed signal light output from the input slab waveguide to give a phase difference according to the waveguide length difference to the plurality of signal lights;

an output slab waveguide for condensing the plurality of signal lights of the wavelength multiplexed signal light output from the plurality of channel waveguides in a plurality of predetermined condensing positions; and a plurality of output channel waveguides for propagating the plurality of signal lights branched and admitted from an incident end located in the plurality of predetermined condensing positions to output the propagated signal lights from an output end, a predetermined number of artificial waveguides having a predetermined core width being provided along the plurality of channel waveguides on both sides of the array waveguide diffraction grating.

BRIEF DESCRIPTION OF THE DRAWINGS

The invention will be explained in more detail in conjunction with appended drawings, wherein.

DESCRIPTION OF THE PREFERRED EMBODIMENTS

Before explaining an optical multiplexer/demultiplexer in preferred embodiments according to the invention, the aforementioned conventional optical multiplexer/demultiplexer will be explained in more detail in conjunction with FIGS. 1 to 8.

Figure 1:
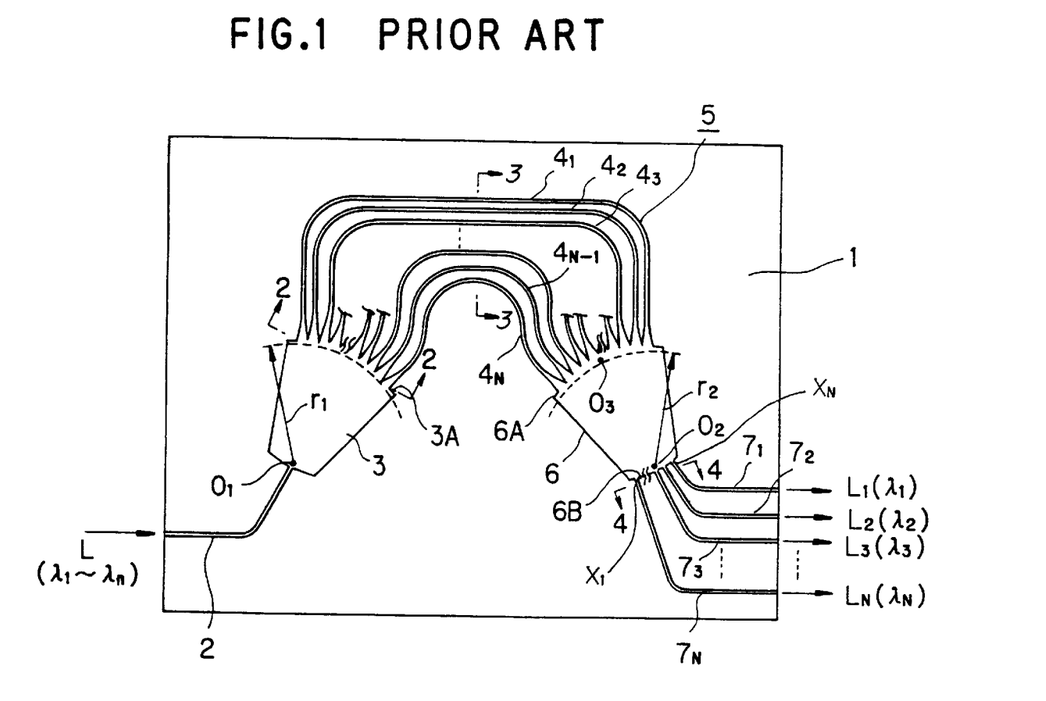
FIG. 1 is a plan view of a conventional optical wavelength multiplexer/demultiplexer.

FIG. 1 shows a conventional optical wavelength multiplexer/demultiplexer. This optical wavelength multiplexer/demultiplexer comprises: a quartz glass substrate 1; a buffer layer, having a slightly lower refractive index than waveguides described below, provided on the substrate; and, provided on the buffer layer in the following order, an input channel waveguide 2, an input slab waveguide 3, an array waveguide diffraction grating 5 provided with a plurality of channel waveguides $4_1$–$4_N$, an output slab waveguide 6, and a plurality of output channel waveguides $7_1$–$7_N$, these elements being successively connected to each other. Further, a clad layer having a slightly lower refractive index than the waveguides is provided on each waveguide.

The input channel waveguide 2 is rectangular in section and, from the outside of the multiplexer/demultiplexer, receives a wavelength multiplexed signal light L with N waves of wavelengths $\lambda_1$–$\lambda_N$ having wavelength spacing $\Delta\lambda$ being multiplexed.

The input slab waveguide 3 is provided with a circular connection face 3A, having a radius of curvature $r_1$ with a center of curvature $O_1$ in the vicinity of a portion where the input slab waveguide 3 is connected to the input channel waveguide 2, between the input slab waveguide 3 and the array waveguide diffraction grating 5. It is constructed so that the wavelength multiplexed signal light L output from the input waveguide 2 is broaden by the diffraction effect.

The array waveguide diffraction grating 5 is rectangular in section and comprises a plurality of channel waveguides $4_1$–$4_N$ with adjacent channel waveguides being different from each other in waveguide length by a length according to the wavelength spacing $\Delta\lambda$. It branches the wavelength multiplexed signal light L to the number of branches corresponding to the number of wavelengths and permits the branched signal light to be passed therethrough. At the same time, a phase difference corresponding to the waveguide length difference of the channel waveguides $4_1$–$4_N$ is given to the signal lights having respective wavelengths of the branched wavelength multiplexed signal light L.

The output slab waveguide 6 is provided with a circular connection face 6A, having a radius of curvature $r_2$ with a center of curvature $O_2$ in the vicinity of a center of a connecting face 6B where the output slab waveguide is connected to a plurality of output channel waveguides $7_1$–$7_N$, between the output slab waveguide 6 and the array waveguide diffraction grating 5. It is constructed so that the signal lights $L_1$–$L_N$ with wavelengths $\lambda_1$–$\lambda_N$ of the wavelength multiplexed signal light L output from the plurality of channel waveguides $4_1$–$4_N$ are condensed in corresponding incident sections of the output channel waveguides $7_1$–$7_N$.

The output channel waveguides $7_1$–$7_N$ are rectangular in section and radially disposed with the center being $O_3$ in the vicinity of the center of a connection face 6A of the output slab waveguide 6. It branches and outputs signal lights $L_1$–$L_N$ corresponding to the wavelengths $\lambda_1$–$\lambda_N$ output from the connection face 6B of the output slab waveguide 6.

Figure 2:
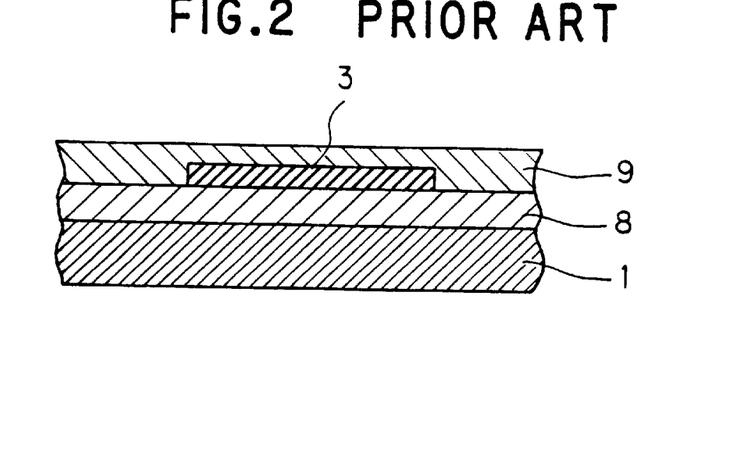
FIG. 2 is a cross-sectional view taken on line 2—2' of FIG. 1.

FIG. 2 is a cross-sectional view taken on line 2—2' of FIG. 1. In FIG. 2, a buffer layer 8 is provided on a quartz glass substrate 1, and a flat input slab waveguide 3 and a clad layer 9 are provided on the surface of the buffer layer 8.

Figure 3:
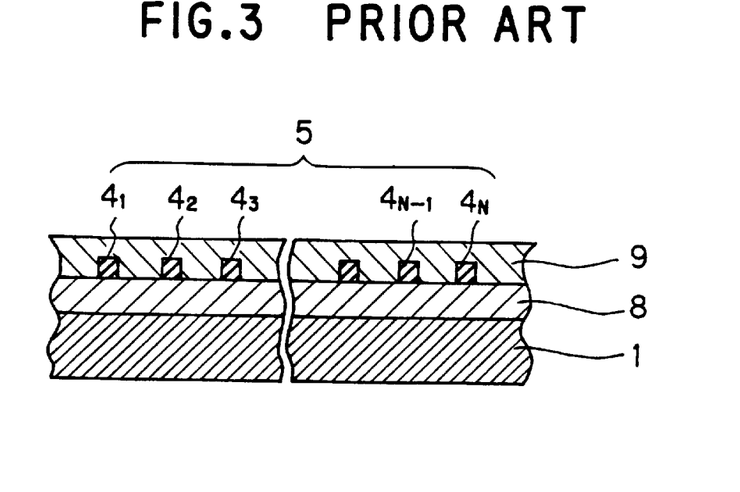
FIG. 3 is a cross-sectional view taken on line 3—3' of FIG. 1.

FIG. 3 is a cross-sectional view taken on line 3—3' of FIG. 1. In FIG. 3, a buffer layer 8 is provided on a quartz glass substrate 1, and an array waveguide diffraction grating 5, constituted by a plurality of channel waveguides $4_1$–$4_N$, and a clad layer 9 are provided on the surface of the buffer layer 8.

Figure 4:
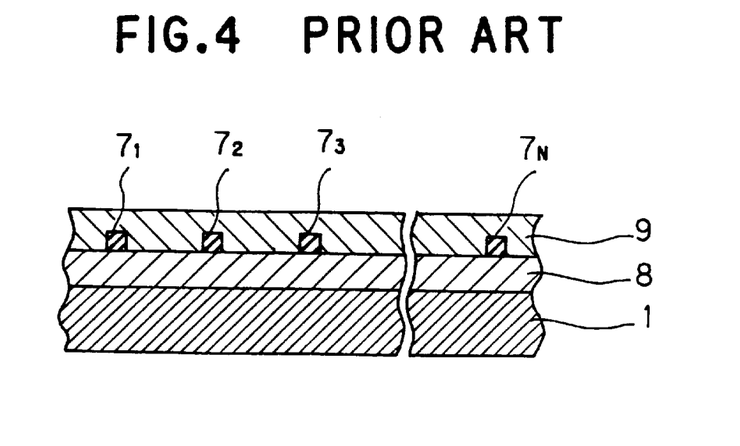
FIG. 4 is a cross-sectional view taken on line 4—4' of FIG. 1.

FIG. 4 is a cross-sectional view taken on line 4—4' of FIG. 1. In FIG. 4, a buffer layer 8 is provided on a quartz glass substrate 1, and incident sections of a plurality of output channel waveguides $7_1$–$7_N$ and a clad layer 9 are provided on the surface of the buffer layer 8.

Figure 5:
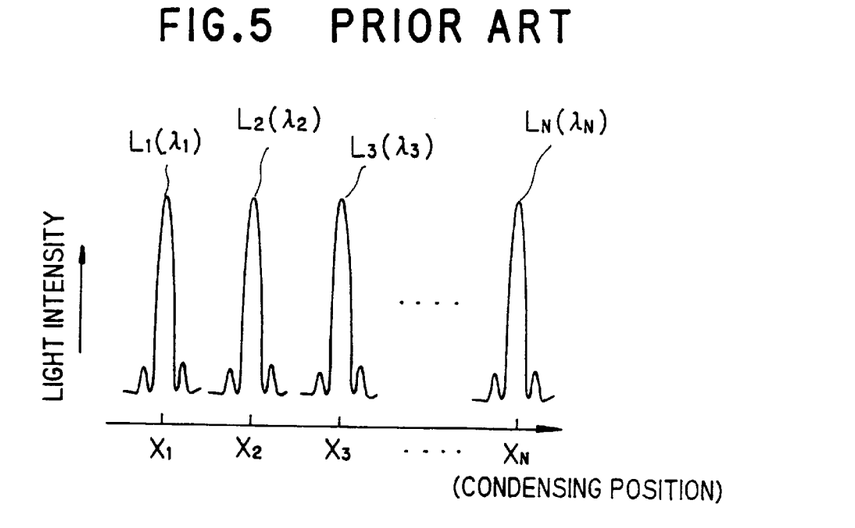
FIG. 5 is an explanatory view showing positions of condensing light signal in the conventional optical wavelength multiplexer/demultiplexer.

FIG. 5 shows the relationship between the condensing position and the light intensity for signal lights $L_1$–$L_N$ with L wavelengths $\lambda_1$–$\lambda_N$ of a wavelength multiplexed signal light output respectively from channel waveguides $4_1$–$4_N$. The signal lights $L_1$–$L_N$ are condensed in positions $x_1$–$x_N$ corresponding to incident sections of output channel waveguides $7_1$–$7_N$ of a connecting face 6B of an output slab waveguide 6. That is, the signal light $L_1$ with wavelength $._1$ output from the channel waveguides $4_1$–$4_N$ is entirely condensed in a position $x_1$ corresponding to the incident section of the output channel waveguide $7_1$. Similarly, signal lights $L_2$, $L_3$ ... $L_N$ with wavelengths $\lambda_2$, $\lambda_3$ ... $\lambda_N$ are condensed in positions $x_2$, $x_3$ ... $x_N$ corresponding respectively to incident sections of the output channel waveguides $7_2$, $7_3$ ... $7_N$.

The above description is for an example where an optical multiplexer/demultiplexer is used as a multiplexer. When the optical multiplexer/demultiplexer is used as a demultiplexer, the term "input" with respect to the multiplexer is replaced with the term "output," and the term "output" with respect to the multiplexer is replaced with the term "input." The same shall apply hereinafter.

In the above construction, a wavelength multiplexed signal light L with N waves of wavelengths $\lambda_1$–$\lambda_N$ having wavelength spacing $\Delta\lambda$ being multiplexed, upon entrance into an input channel waveguide 2 through an optical fiber (not shown), is broaden by the diffraction effect in the input slab waveguide 3 and, after branching, enters a plurality of channel waveguides $4_1$–$4_N$ constituting the array wave guide diffraction grating 5. To the wavelength multiplexed signal light L, which has entered the plurality of channel waveguides $4_1$–$4_N$, is given a phase difference according to the waveguide length of the channel waveguides $4_1$–$4_N$ for each wavelength $\lambda_1$–$\lambda_N$. This permits signal light $L_1$ of $\lambda_1$ output from the channel waveguides $4_1$–$4_N$ to be entirely condensed in a position $x_1$ corresponding to the incident section of the output channel waveguide $7_1$. Similarly, signal lights $L_2$, $L_3$ ... $L_N$ of $\lambda_2$, $\lambda_3$ ... $\lambda_N$ are condensed in positions $x_2$, $x_3$ ... $\lambda_N$ corresponding respectively to incident sections of the output channel waveguides $7_2$, $7_3$ ... $7_N$. The signal lights $L_1$–$L_N$, which have been demultiplexed and condensed in the incident sections of the output channel waveguides $7_1-7_N$, are propagated through the output channel waveguides $7_1-7_N$ and output from the output side thereof.

The relationship between the array waveguide diffraction grating 5 and the demultiplexing of the wavelength multiplexed signal light in the above optical wavelength multiplexer/demultiplexer will be described.

Figure 6:
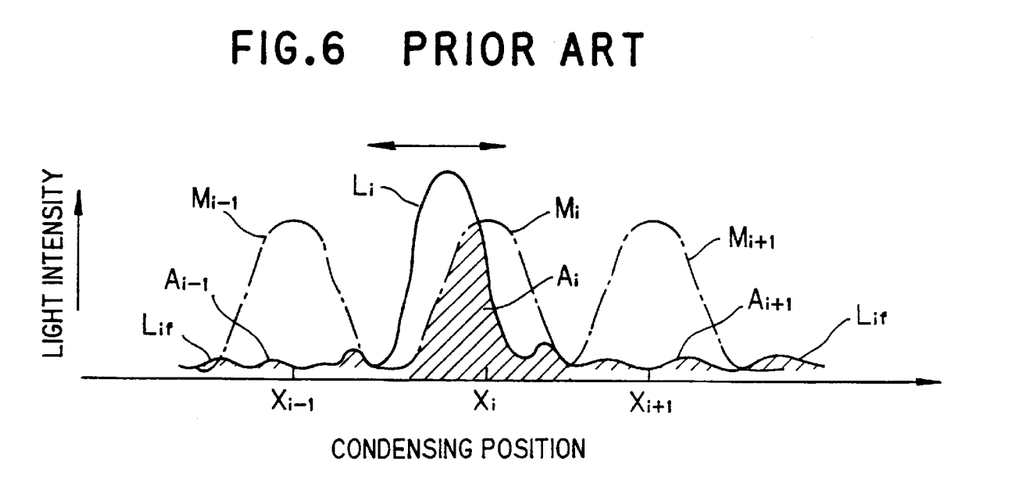
FIG. 6 is an explanatory view showing the relationship between the electric field distribution of signal light in the condensing position in the conventional optical wavelength multiplexer/demultiplexer and the electric field distribution of the output channel waveguide.

FIG. 6 shows the relationship between the condensing position x of signal light $L_i$ (i=1–N) in the connecting face 6B of the output slab waveguide 6 and the loss of the output channel waveguide $7_i$ (i=1–N). For the signal light $L_i$ condensed in the connecting face 6B of the output slab waveguide 6, the condensing position x is shifted according to the wavelength. In this case, the intensity of light coupled with the output channel waveguide $7_i$ is represented by the superposed integrated portion $A_i$ with respect to the waveguide mode $M_i$ of the output channel waveguide $7_i$ and the signal light $L_i$. For this reason, when the condensing position x shifts with the wavelength, the superposed integrated portion $A_i$ varies. When this portion $A_i$ becomes maximum, the loss becomes minimum.

Figure 7:
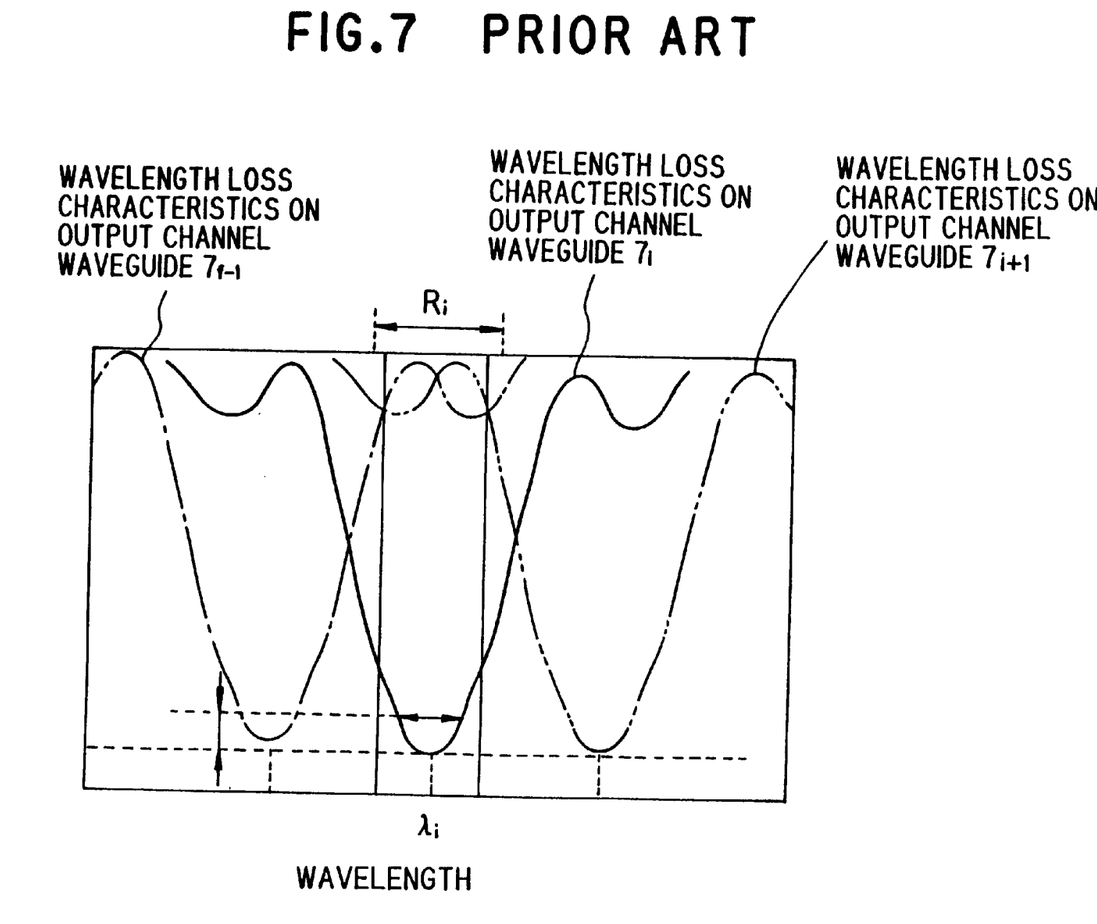
FIG. 7 is an explanatory view showing the wavelength loss characteristics in the conventional optical wavelength multiplexer/demultiplexer.

FIG. 7 shows wavelength loss characteristics for the output channel waveguide $7_i$. As described above, when the condensing position is shifted according to the wavelength, in the service band $R_i$, the superposed integrated portion $A_i$ becomes maximum at wavelength $\lambda_i$ with the loss becoming minimum. In this case, a portion of 3 db above the minimum loss is designated as "3 db bandwidth $R_d$," and the wavelength of the center in the 3 db bandwidth, that is, the wavelength $\lambda_i$, is designated as "center wavelength."

According to the conventional optical wavelength multiplexer/demultiplexer, there is a difference in density of the plurality of channel waveguides between the center portion and both end portions. Therefore, in the preparation of a plurality of channel waveguides, even when the cores are designed to have an identical width, the difference in etching speed unfavorably creates a variation or fluctuation in core width. The phase velocity of the array waveguide diffraction grating depends upon the core width, and the variation and fluctuation in core width create a deviation from the set value with respect to the condensing position and the amount of condensation within the output slab waveguide.

Figure 8:
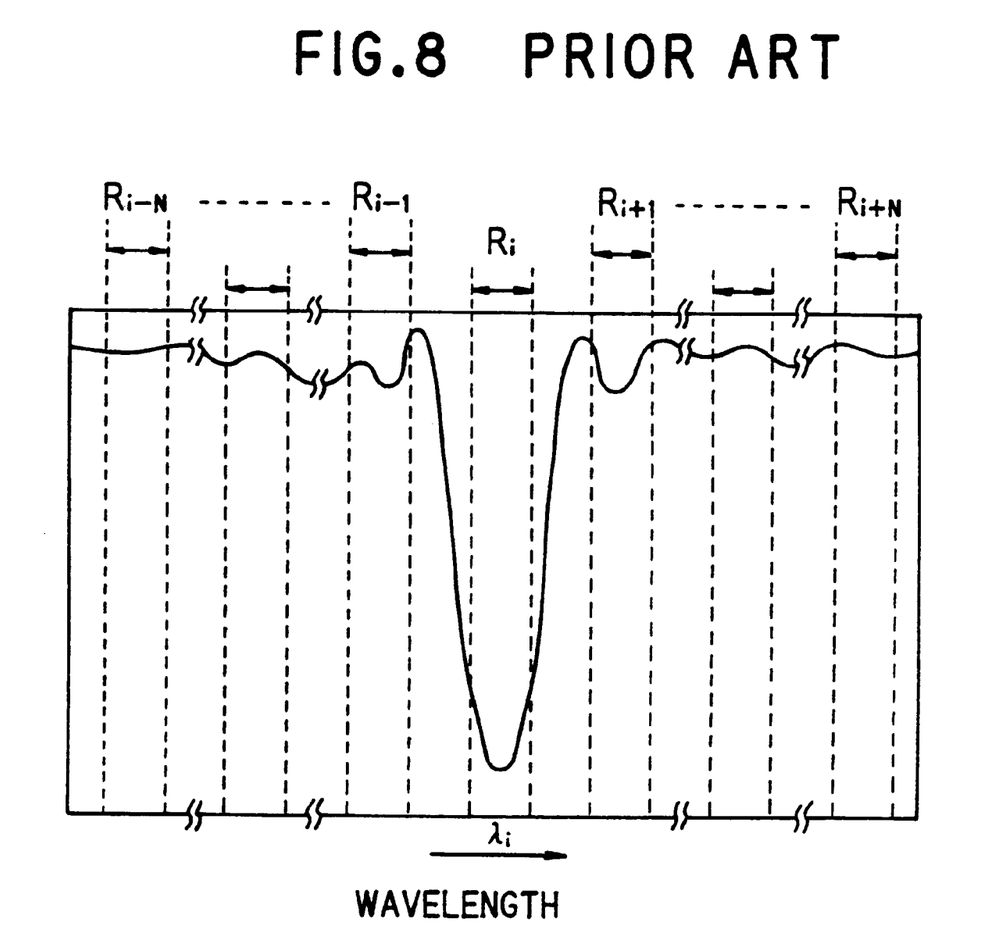
FIG. 8 is an explanatory view showing the wavelength loss characteristics in the conventional optical wavelength multiplexer/demultiplexer.

On the other hand, in FIG. 6, the creation of a deviation from the design value with respect to the phase difference of the channel waveguides and the creation of a deviation of the condensing position of the signal light $L_i$ results in the creation of a tail $L_{if}$ in the signal light $L_i$. The tail $L_{if}$ of the signal light $L_i$ is superposed on a waveguide mode $M_{i-1}$, $M_{i+1}$ of the different output channel waveguide $7_{i-1}$, $7_{i+1}$, providing such a wavelength loss curve that, as shown in FIG. 8, a very small amount of light is present in a wavelength distant from the wavelength $\lambda_i$. This imperfect condensing is causative of increased light leakage to different service bands $R_{i-1}-R_{i-N}$, $R_{i+1}-R_{i+N}$, posing a problem of deteriorated crosstalk.

Next, an optical multiplexer/demultiplexer in the preferred embodiment according to the invention will be explained in conjunction with FIGS. 9 and 10.

Figure 9:
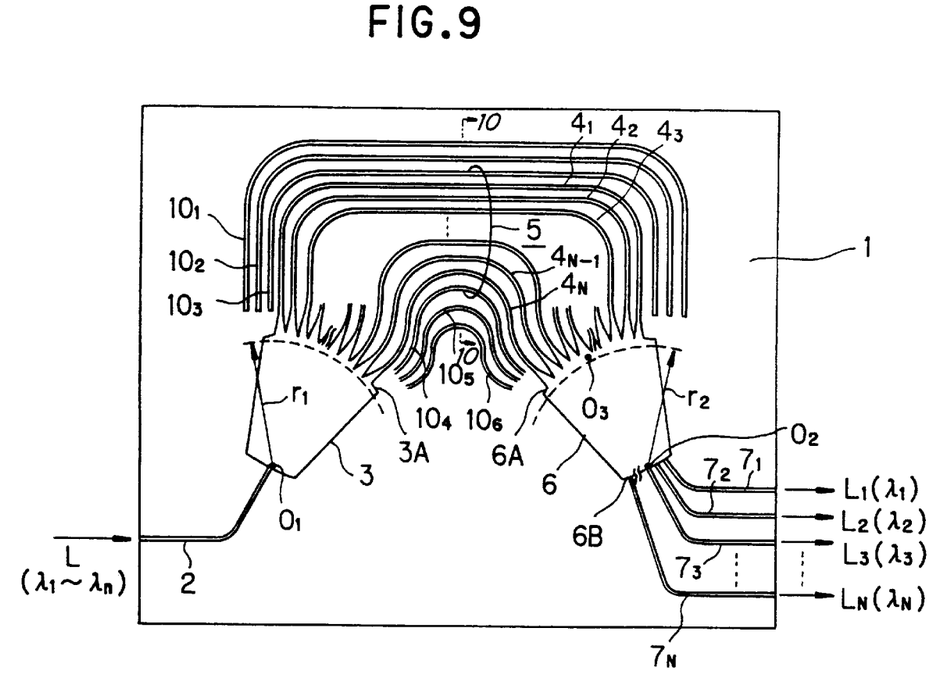
FIG. 9 is a plan view showing the first embodiment of the present invention.

FIG. 9 is an optical wavelength multiplexer/demultiplexer according to the first embodiment of the present invention. This optical wavelength multiplexer/demultiplexer comprises: a quartz glass substrate 1; a buffer layer, having a slightly lower refractive index than waveguides described below, provided on the substrate 1; provided on the buffer layer in the following order, an input channel waveguide 2, an input slab waveguide 3, an array waveguide diffraction grating 5 provided with a plurality of channel waveguides $4_1-4_N$, an output slab waveguide 6, and a plurality of output channel waveguides $7_1-7_N$, these elements being successively connected to each other; artificial waveguides $10_1-10_6$ not connected to the input slab waveguide 3 and the output slab waveguide 6; and a clad layer, having a slightly lower refractive index than the waveguides, provided on each waveguide.

The input channel waveguide 2 is rectangular in section and, from an input optical fiber (not shown), receives a wavelength multiplexed signal light L with N waves of wavelengths $\lambda_1-\lambda_N$ having wavelength spacing $\Delta\lambda$ being multiplexed.

The input slab waveguide 3 is provided with a circular connection face 3A, having a radius of curvature $r_1$ with a center of curvature $O_1$ in the vicinity of a portion where the input slab waveguide 3 is connected to the input channel waveguide 2, between the input slab waveguide 3 and the array waveguide diffraction grating 5. It is constructed so that the wavelength multiplexed signal light L output from the input waveguide 2 is broaden by the diffraction effect.

The array waveguide diffraction grating 5 is rectangular in section and comprises a plurality of channel waveguides $4_1-4_N$ with adjacent channel waveguides being different from each other in waveguide length by a length according to the wavelength spacing $\Delta\lambda$. It branches the wavelength multiplexed signal light L to the number of branches corresponding to the number of wavelengths and permits the branched signal light to be passed therethrough. At the same time, a phase difference corresponding to the waveguide length difference of the channel waveguides $4_1-4_N$ is given to the signal lights having respective wavelengths of the branched wavelength multiplexed signal light L.

The output slab waveguide 6 is provided with a circular connection face 6A, having a radius of curvature $r_2$ with a center of curvature $O_2$ in the vicinity of a center of a connecting face 6B where the output slab waveguide is connected to a plurality of output channel waveguides $7_1-7_N$, between the array waveguide diffraction grating 5 and the output slab waveguide 6. It is constructed so that the signal lights $L_1-L_N$ with wavelengths $\lambda_1-\lambda_N$ of the wavelength multiplexed signal light L output from the plurality of channel waveguides $4_1-4_N$ are condensed in corresponding incident sections of the output channel waveguides $7_1-7_N$.

The output channel waveguides $7_1-7_N$ are rectangular in section and radially disposed with the center being $O_3$ in the vicinity of the center of a connection face 6A of the output slab waveguide 6. It branches and outputs, from the output terminal, signal lights $L_1-L_N$ corresponding to the wavelengths $\lambda_1-\lambda_N$ output from the connection face 6B of the output slab waveguide 6.

Regarding the artificial waveguides $10_1-10_6$, three artificial waveguides are provided on each side of the array waveguide diffraction grating 5.

Figure 10:
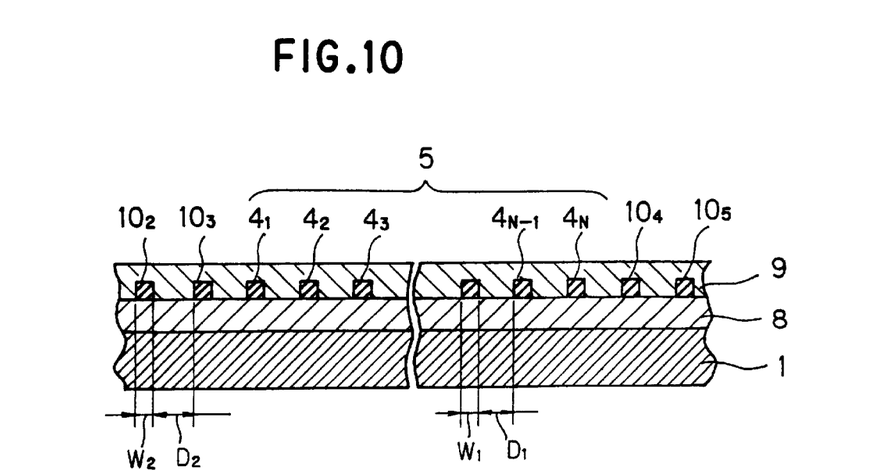
FIG. 10 is a cross-sectional view taken on line 10—10' of FIG. 9.

FIG. 10 is a cross-sectional view taken on line 10—10' of the optical wavelength multiplexer/demultiplexer. In FIG. 10, a buffer layer 8 is provided on a quartz glass substrate 1. On the buffer layer 8 are provided a plurality of channel waveguides $4_1-4_N$ with core width $W_1$ at interval $D_1$ and artificial waveguides $10_1-10_6$ (artificial waveguides $10_1$ and $10_6$ being not shown) with core width $W_2$ equal to the core width of the plurality of channel waveguides $4_1-4_N$. The artificial waveguides are provided, at interval $D_2$ equal to the interval of the plurality of channel waveguides $4_1-4_N$, on both sides of the array waveguide diffraction grating 5 so as to be parallel to one another, and these waveguides are covered with the clad layer 9.

Provision of artificial waveguides $10_1$–$10_6$ with core width $W_2$ and interval $D_2$ equal to core $W_1$ and interval $D_1$ of the plurality of channel waveguides $4_1$–$4_N$ on both sides of the array waveguide diffraction grating 5 permits the density in the center portion and the density in both end portions of the plurality of channel waveguides $4_1$–$4_N$ to be made close to each other, thereby rendering the density of the whole plurality of channel waveguides uniform, which enables the etching conditions to be made even. This in turn realizes a reduction in a variation or fluctuation in core width $W_1$ of the plurality of channel waveguides $4_1$–$4_N$.

In the above construction, a wavelength multiplexed signal light L with N waves of wavelengths $\lambda_1$–$\lambda_N$ having wavelength spacing $\Delta\lambda$ being multiplexed, upon entrance into an input channel waveguide 2 through an optical fiber (not shown), is broaden by the diffraction effect in the input is slab waveguide 3 and, after branching, enters a plurality of channel waveguides $4_1$–$4_N$ constituting the array waveguide diffraction grating 5. To the wavelength multiplexed signal light L, which has entered the plurality of channel waveguides $4_1$–$4_N$, is given a phase difference according to the waveguide length of the channel waveguides $4_1$–$4_N$ for each wavelength $\lambda_1$–$\lambda_N$. In this case, since the variation and fluctuation in core width $W_1$ of the plurality of channel waveguides $4_1$–$4_N$ constituting the array waveguide diffraction grating 5 are reduced, a desired phase difference having no deviation from the designed value in the channel waveguides $4_1$–$4_N$ is given. This permits signal light $L_1$ of $\lambda_1$ output from the channel waveguides $4_1$–$4_N$ to be entirely condensed in the incident section of the output channel waveguide $7_1$. Similarly, signal lights $L_2$, $L_3$ ... $L_N$ of $\lambda_2$, $\lambda_3$ ... $\lambda_N$ are condensed in the incident sections of the output channel waveguides $7_2$, $7_3$ ... $7_N$. Also at the time of the condensing, in the channel waveguides $4_1$–$4_N$, a desired phase difference having no deviation from the designed value is given, creating no deviation in the position and amount of the condensing. The signal lights $L_1$–$L_N$, which have been demultiplexed and condensed in the incident sections of the output channel waveguides $7_1$–$7_N$, are propagated through the output channel waveguides $7_1$–$7_N$ and output from the output terminal 7A.

Thus, provision of artificial waveguides $10_1$–$10_6$ with core width $W_2$ and interval $D_2$ equal to core $W_1$ and interval $D_1$ of the plurality of channel waveguides $4_1$–$4_N$ on both sides of the array waveguide diffraction grating 5 can reduce a variation and a fluctuation in core width of the plurality of channel waveguides $4_1$–$4_N$ derived from the production process, preventing a deviation of the position and amount of the condensing in the output slab waveguide 6 from the designed values. This in turn can reduce light leakage to different service bands derived from the imperfect condensing, resulting in improved crosstalk characteristics. According to experiments conducted by the present inventor, when no artificial waveguide is provided on both sides of the array waveguide diffraction grating, the maximum variation in core width was 0.1 $\mu$m, whereas the provision of the artificial waveguide on both sides of the array waveguide diffraction grating resulted in a reduction in the variation in core width to 0.05 $\mu$m. The crosstalk of this optical wavelength multiplexer/demultiplexer was measured and found to be 32 to 35 db, that is, good results unattainable by the prior art.

Although a quartz glass substrate has been used in the above embodiment, other materials permeable to light, for example, semiconductors and $LiNbO_3$, can provide the same results.

As described above, according to the optical wavelength multiplexer/demultiplexer of the present invention, provision of a predetermined number of artificial waveguides having a predetermined core width being provided along a plurality of channel waveguides on both sides of the array waveguide diffraction grating can reduce a variation or a fluctuation in core width, improving the crosstalk characteristics.

The invention has been described in detail with particular reference to preferred embodiments, but it will be understood that variations and modifications can be effected within the scope of the invention as set forth in the appended claims.

What is claimed is:

1. An optical wavelength multiplexer/demultiplexer comprising:

an input channel waveguide provided on a substrate, the input channel waveguide being adapted for inputting a wavelength multiplexed signal light formed by multiplexing a plurality of signal lights having a predetermined wavelength spacing;

an input slab waveguide for broadening the wavelength multiplexed signal light output from the input channel waveguide;

an array waveguide diffraction grating having a plurality of channel waveguides, the plurality of channel waveguides having a waveguide length determined by the wavelength spacing and adapted for branching and propagating the wavelength multiplexed signal light output from the input slab waveguide to give a phase difference according to the waveguide length difference to the plurality of signal lights;

an output slab waveguide for condensing the plurality of signal lights of the wavelength multiplexed signal light output from the plurality of channel waveguides in a plurality of predetermined condensing positions; and     a plurality of output channel waveguides for propagating the plurality of signal lights branched and admitted from an incident end located in the plurality of predetermined condensing positions to output the propagated signal lights from an output terminal,     a predetermined number of artificial waveguides having a predetermined core width being provided along the plurality of channel waveguides on both sides of the array waveguide diffraction grating.

2. The optical wavelength multiplexer/demultiplexer according to claim 1, wherein the predetermined core width in the artificial waveguides is substantially the same as the core width of the plurality of channel waveguides.

3. The optical wavelength multiplexer/demultiplexer according to claim 1, wherein a plurality of the artificial waveguides are provided at a predetermined spacing.

4. The optical wavelength multiplexer/demultiplexer according to claim 3, wherein the predetermined spacing of the artificial waveguides is substantially the same as the spacing of the plurality of channel waveguides.

\* \* \* \* \*